(12) United States Patent
Lim

(10) Patent No.: US 11,300,768 B2
(45) Date of Patent: Apr. 12, 2022

(54) OPTICAL INSPECTION APPARATUS

(71) Applicant: Samsung Display Co., Ltd., Yongin-si (KR)

(72) Inventor: Yong Woon Lim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/109,004

(22) Filed: Dec. 1, 2020

(65) Prior Publication Data

US 2021/0239959 A1   Aug. 5, 2021

(30) Foreign Application Priority Data

Feb. 5, 2020   (KR) .................. 10-2020-0013822

(51) Int. Cl.
  *G02B 21/16*   (2006.01)
  *G02B 21/36*   (2006.01)
  (Continued)

(52) U.S. Cl.
  CPC ......... *G02B 21/16* (2013.01); *G01N 21/6489* (2013.01); *G02B 21/08* (2013.01);
  (Continued)

(58) Field of Classification Search
  CPC .. G02B 21/16; G02B 21/365; G02B 27/1013; G02B 21/08; G02B 26/0825;
  (Continued)

(56) References Cited

U.S. PATENT DOCUMENTS 10,168,281 B2 *  1/2019  Shoji ................... G01N 21/645
10,520,437 B1 *  12/2019  Stebbins ............... G02B 27/56
(Continued)

FOREIGN PATENT DOCUMENTS

JP      2006235624 A  *  9/2006  ............ G02B 21/06
JP      6351765          7/2018
(Continued)

OTHER PUBLICATIONS

C. Hsieh, M. Verma and Q. Liu, "Improving Depth Sensitive Fluorescence Spectroscopy With Wavefront Shaping by Spectral and Spatial Filtering," in IEEE Access, vol. 7, pp. 170192-170198, 2019, doi: 10.1109/ACCESS.2019.2955564. (Year: 2019).*

(Continued)

*Primary Examiner* — Marnie A Matt
(74) *Attorney, Agent, or Firm* — H.C. Park & Associates, PLC

(57) ABSTRACT

An optical inspection apparatus includes: a first filter having a plurality of passbands; a first beam splitter to reflect a first light that exits from the first filter to transfer the first light to an inspection target; a second beam splitter to split a second light, which is provided by reflecting the first light by the inspection target, into a first split light and a second split light; a second filter to receive the first split light, and having a passband different from the passbands of the first filter; a fluorescence microscope to generate a fluorescence image from a third light that exits from the second filter; and a first imaging module to generate a first image from the second split light.

20 Claims, 11 Drawing Sheets

(51) Int. Cl.
  *G02B 27/10* (2006.01)
  *G02B 21/08* (2006.01)
  *G02B 26/08* (2006.01)
  *H04N 9/04* (2006.01)
  *H04N 5/247* (2006.01)
  *G06T 7/00* (2017.01)
  *H04N 5/225* (2006.01)
  *G01N 21/64* (2006.01)

(52) U.S. Cl.
  CPC ....... *G02B 21/365* (2013.01); *G02B 26/0825* (2013.01); *G02B 27/1013* (2013.01); *G06T 7/0004* (2013.01); *H04N 5/2256* (2013.01); *H04N 5/247* (2013.01); *H04N 9/0455* (2018.08); *G06T 2207/10056* (2013.01); *G06T 2207/30108* (2013.01)

(58) Field of Classification Search
  CPC .... H04N 9/0455; H04N 5/247; H04N 5/2256; G06T 7/0004; G06T 2207/10056; G06T 2207/30108; G01N 21/6489
  USPC .......................................................... 348/79
  See application file for complete search history.

(56) References Cited

U.S. PATENT DOCUMENTS

| | | | |
|---|---|---|---|
| 2012/0275019 A1* | 11/2012 | Letovsky | G01J 3/10 359/385 |
| 2019/0353585 A1* | 11/2019 | Shin | G01N 21/27 |
| 2020/0382721 A1* | 12/2020 | Harfouche | G01N 21/8806 |

FOREIGN PATENT DOCUMENTS

| | | | | |
|---|---|---|---|---|
| JP | 2018536191 A | * | 12/2018 | ............. G02B 21/36 |
| KR | 10-0604357 | | 7/2006 | |
| KR | 10-0843468 | | 7/2008 | |
| KR | 10-0964251 | | 6/2010 | |
| KR | 10-1080382 | | 11/2011 | |
| KR | 10-2015-0072275 | | 6/2015 | |
| KR | 10-1541610 | | 8/2015 | |
| KR | 10-1558232 | | 10/2015 | |
| KR | 10-1652356 | | 8/2016 | |
| KR | 10-1745797 | | 6/2017 | |
| KR | 10-2018-0056884 | | 5/2018 | |
| KR | 10-1898220 | | 9/2018 | |
| KR | 10-1899711 | | 9/2018 | |
| KR | 10-2019-0088930 | | 7/2019 | |
| WO | WO-2007054301 A1 | * | 5/2007 | ......... G02B 27/1006 |

OTHER PUBLICATIONS

M. Shimizu, A. Ishii and T. Nishimura, "Detection of foreign material included in LCD panels," 2000 26th Annual Conference. IECON 2000. 2000 IEEE International Conference on Industrial Electronics, Control and Instrumentation. 21st Century Technologies, 2000, pp. 836-841 (Year: 2000).*

* cited by examiner

OPTICAL INSPECTION APPARATUS

CROSS-REFERENCE TO RELATED APPLICATION

This application claims priority from and the benefit of Korean Patent Application No. 10-2020-0013822 filed on Feb. 5, 2020 which is hereby incorporated by reference for all purposes as if fully set forth herein.

BACKGROUND

Field

Exemplary implementations of the invention relate generally to an optical inspection apparatus, and more specifically, to an optical inspection apparatus used for inspecting electronic devices.

Discussion of the Background

A display device includes a display panel including a pixel array. For quality control of the display device, inspection processes may be performed after the display panel is formed.

For example, in order to detect defects of an electronic device such as defective pixels and the like of the display panel, automatic optical inspection may be performed by using an imaging module. In order to increase reliability of the optical inspection, or to find a cause of a defect, more information on the defect may be required.

The above information disclosed in this Background section is only for understanding of the background of the inventive concepts, and, therefore, it may contain information that does not constitute prior art.

SUMMARY

Optical inspection apparatus constructed according to the principles and exemplary implementations of the invention may improve correctness and reliability for inspection, and may provide increased inspection speed. For example, the optical inspection apparatus may capture an inspection target to obtain a two-dimensional image based on a gray level and a fluorescence image. The optical inspection apparatus may detect defects of the inspection target based on the two-dimensional image, and may identify or classify the material or cause of the defects based on the fluorescence image. Accordingly, the optical inspection apparatus may provide the information of the defects with improved reliability. In addition, the optical inspection apparatus may obtain the two-dimensional image and the fluorescence image from the same input light, and thus they may be obtained in a relatively short time. Therefore, the optical inspection apparatus may provide the information of the defects in a relatively short time.

Additional features of the inventive concepts will be set forth in the description which follows, and in part will be apparent from the description, or may be learned by practice of the inventive concepts.

According to one aspect of the invention, an optical inspection apparatus includes: a first filter having a plurality of passbands; a first beam splitter to reflect a first light that exits from the first filter to transfer the first light to an inspection target; a second beam splitter to split a second light, which is provided by reflecting the first light by the inspection target, into a first split light and a second split light; a second filter to receive the first split light, and having a passband different from the passbands of the first filter; a fluorescence microscope to generate a fluorescence image from a third light that exits from the second filter; and a first imaging module to generate a first image from the second split light.

The passbands of the first filter may be discontinuous and may include an ultraviolet region, a blue region, a green region, and a red region.

The passband of the second filter may include a wavelength range corresponding to a fluorescence component generated by excitation of the first light caused by the inspection target.

The passband of the second filter may include a blue fluorescence region, a green fluorescence region, a red fluorescence region, and an infrared fluorescence region.

The passbands of the first filter may include a blue region, a green region, and a red region.

The optical inspection apparatus may include: a third beam splitter to split the second split light into a third split light and a fourth split light; a multiple beam splitter to split the fourth split light into a plurality of wavelength-divided lights having different wavelengths and spatially separated from each other; and a second imaging module to generate second images from the plurality of wavelength-divided lights.

The first imaging module may generate the first image from the third split light.

The wavelength-divided lights may include a red light, a green light, and a blue light.

The wavelength-divided lights may include a red light, a green light, a blue light, and an ultraviolet light.

The optical inspection apparatus may further include an analysis part to generate vertical direction information of the inspection target based on the second images.

The analysis part may be configured to: detect a first defect based on a two-dimensional image obtained by the first imaging module, the two-dimensional image being included in the first image, and detect a second defect based on the vertical direction information of the inspection target associated with the first defect.

The optical inspection apparatus may further include a wavefront transformation element to adjust a focal length of an input light incident on the first filter.

The wavefront transformation element may include a deformable mirror.

The optical inspection apparatus may further include an analysis part to generate vertical direction information of the inspection target. The wavefront transformation element may be configured to generate a plurality of fourth lights having mutually different focal lengths and to provide the plurality of fourth lights as the input light, the second imaging module may be configured to generate the second images from the plurality of wavelength-divided lights associated with the plurality of fourth lights, and the analysis part may be configured to obtain a through-focus image based on the second images and to generate the vertical direction information of the inspection target from the through-focus image.

The optical inspection apparatus may further include a third filter disposed between the first imaging module and the second beam splitter to filter the second split light.

The third filter may be configured to block a light corresponding to the passband of the second filter.

The optical inspection apparatus may further include an analysis part to detect a defect based on a two-dimensional image obtained by the first imaging module, the two-dimensional image being included in the first image, and to identify or classify a material or a cause of the defect based on the fluorescence image obtained by the fluorescence microscope.

The optical inspection apparatus may further include: a light source to provide an initial light to the first filter; and a light source lens to concentrate the initial light.

The optical inspection apparatus may further include an objective lens disposed between the first beam splitter and the inspection target.

The inspection target may include an organic light-emitting display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
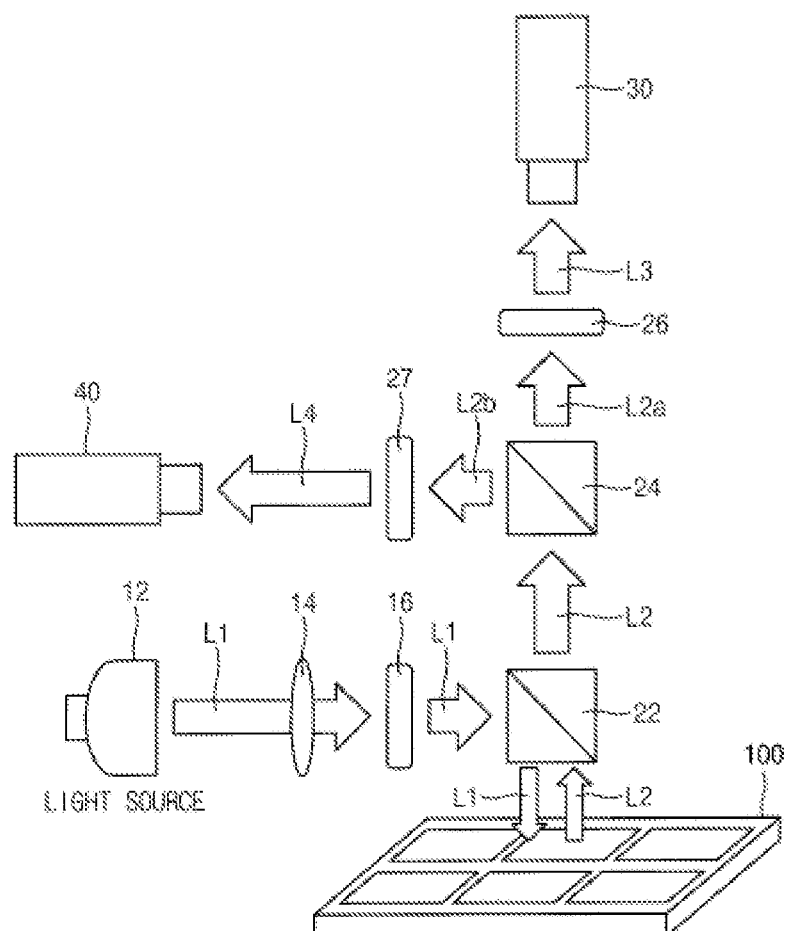
FIG. 1 is a schematic view of an exemplary embodiment of an optical inspection apparatus constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath"

other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2A:
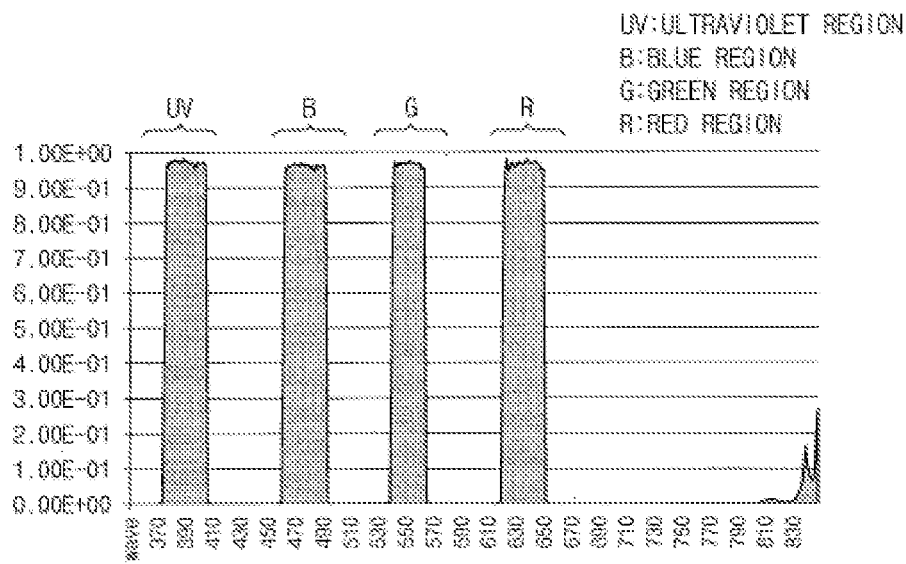
FIG. 2A is a graph of a passband spectrum of an exemplary embodiment of a first filter of FIG. 1.
Figure 2B:
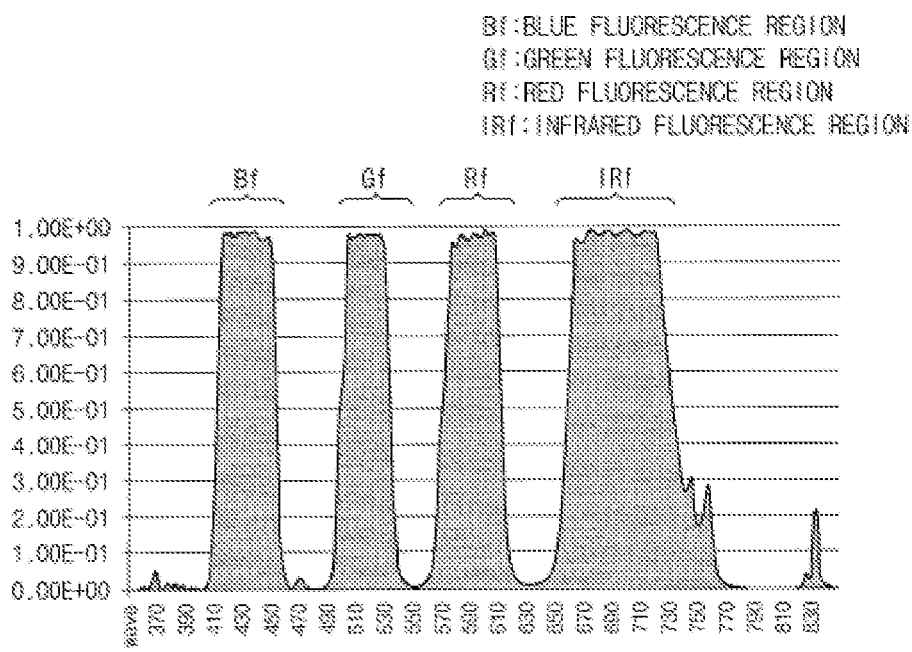
FIG. 2B is a graph of a passband spectrum of an exemplary embodiment of a second filter of FIG. 1.
Figure 2C:
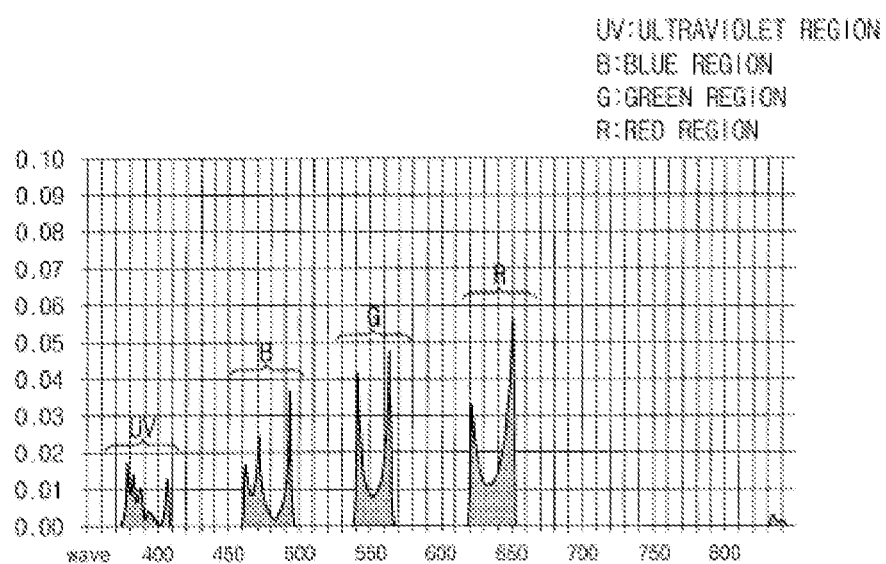
FIG. 2C is a graph of a passband spectrum of an exemplary embodiment of a third filter of FIG. 1.
Figure 3:
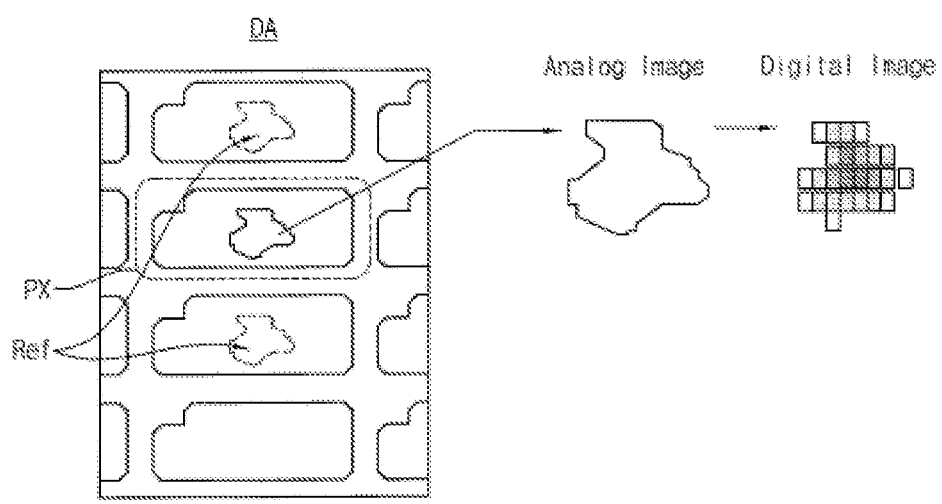
FIG. 3 is a view for illustrating defect detection processes in an optical inspection method.
Figure 4:
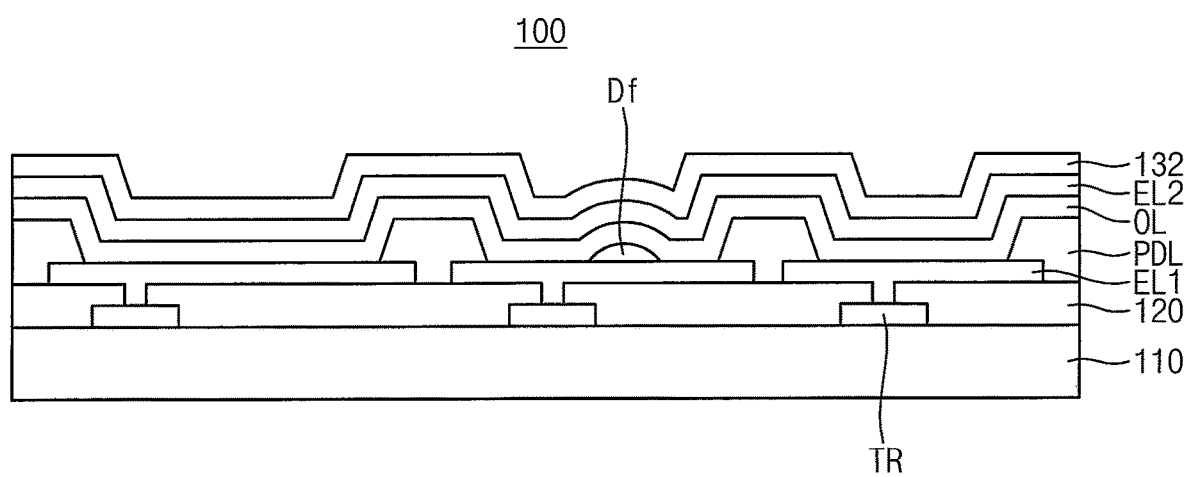
FIG. 4 is a sectional view of an exemplary embodiment of an organic light-emitting display panel.

FIG. 1 is a schematic view of an exemplary embodiment of an optical inspection apparatus constructed according to the principles of the invention. FIG. 2A is a graph of a passband spectrum of an exemplary embodiment of a first filter of FIG. 1. FIG. 2B is a graph of a passband spectrum of an exemplary embodiment of a second filter of FIG. 1. FIG. 2C is a graph of a passband spectrum of an exemplary embodiment of a third filter of FIG. 1. FIG. 3 is a view for illustrating defect detection processes in an optical inspection method. FIG. 4 is a sectional view of an exemplary embodiment of an organic light-emitting display panel.

Referring to FIG. 1, according to an embodiment, an optical inspection apparatus may include a light source 12, a first beam splitter 22, a second beam splitter 24, a fluorescence microscope 30, and an imaging module 40.

A light source lens 14 and a first filter 16 may be disposed between the light source 12 and the first beam splitter 22.

The light source 12 may generate a light. For example, an initial light LI emitted from the light source 12 may include an ultraviolet light and a visible light.

The light source lens 14 may concentrate or modify the initial light LI emitted from the light source 12. For example, the light source lens 14 may be disposed between the light source 12 and the first filter 16. However, exemplary embodiments are not limited to the above configuration, and the light source lens 14 may be, for example, disposed between the first filter 16 and the first beam splitter 22.

The first filter 16 may filter the initial light LI. For example, the first filter 16 may be a band-pass filter having a specific passband. The first filter 16 may have a plurality of discontinuous passbands.

In FIG. 2A, the horizontal axis denotes a wavelength, and the vertical axis denotes energy and/or power of a light passing through the first filter 16. Referring to FIG. 2A, the first filter 16 may have passbands corresponding to an ultraviolet region UV, a blue region B, a green region G, and a red region R. The passbands of the first filter 16 may be referred to as an input light passband.

Accordingly, a first light L1 output from the first filter 16 may have a wavelength range corresponding to the passbands. For example, the first light L1 may have a wavelength range of 370 nm to 410 nm, 460 nm to 490 nm, 540 nm to 570 nm, and 620 nm to 650 nm. The first light L1 may be referred to as an input light.

The first light L1 output from the first filter 16 may be incident on the first beam splitter 22. The first beam splitter 22 may transfer the first light L1 to an inspection target 100. An optical member such as an objective lens may be additionally provided between the first beam splitter 22 and the inspection target 100.

According to an exemplary embodiment, the inspection target 100 may be a display panel including a pixel array. For example, the display panel may be a display panel including an organic light-emitting diode. However, exemplary embodiments are not limited thereto, and the inspection target 100 may include various electronic devices such as an array substrate of a liquid crystal display panel, a memory cell substrate, a processor, and an integrated circuit board.

The first light L1 may be incident on the inspection target 100, and a second light L2 that is the first light L1 reflected from the inspection target 100 may be incident on the first beam splitter 22. The first beam splitter 22 may serve as a half mirror. The half mirror of the first beam splitter 22 may reflect the first light L1 transmitted from the first filter 16 to the inspection target 100, and may transmit the second light L2 from the inspection target 100 to the second beam splitter 24. Accordingly, the second light L2 transmitted through the first beam splitter 22 may be incident on the second beam splitter 24. The second light L2 may be referred to as a reflected light.

The second beam splitter 24 may split the second light L2 to generate a first split light L2a and a second split light L2b.

A second filter 26 may be disposed between the second beam splitter 24 and the fluorescence microscope 30. The second filter 26 may be a fluorescence filter. The second filter 26 may have a passband different from the passband of the first filter 16. For example, the second filter 26 may have a plurality of substantially discontinuous passbands, and each of the passbands may correspond to a fluorescence band generated by excitation of the first light L1. Accordingly, the passband of the second filter 26 may have a wavelength range shifted from the passband of the first filter 16. For example, the first light L1 may be excited by at least a portion of the inspection target 100 to have shifted wavelengths when the first light L1 is reflected by the inspection target 100, and the first light L1 having the shifted wavelengths may be provided as the second light L2. The second filter 26 may pass at least parts of the shifted wavelengths through the passbands.

In FIG. 2B, the horizontal axis denotes a wavelength, and the vertical axis denotes energy and/or power of a light passing through the second filter 26. Referring to FIG. 2B, the second filter 26 may have passbands corresponding to a blue fluorescence region Bf, a green fluorescence region Gf, a red fluorescence region Rf, and an infrared fluorescence region IRf. The passbands of the second filter 26 may be referred to as a fluorescence passband.

For example, a passband of the blue fluorescence region Bf may transmit a fluorescence component generated by the ultraviolet region UV of the first light L1, a passband of the green fluorescence region Gf may transmit a fluorescence component generated by the blue region B of the first light L1, a passband of the red fluorescence region Rf may transmit a fluorescence component generated by the green region G of the first light L1, and a passband of the infrared fluorescence region IRf may transmit a fluorescence component generated by the red region R of the first light L1.

Accordingly, a third light L3 filtered by the second filter 26 may include a fluorescence component having a wavelength range corresponding to the fluorescence passband.

The fluorescence microscope 30 may obtain one or more fluorescence images from the third light L3. For example, a first fluorescence image corresponding to the blue fluorescence region Bf may be obtained, a second fluorescence image corresponding to the green fluorescence region Gf may be obtained, a third fluorescence image corresponding to the red fluorescence region Rf may be obtained, and a fourth fluorescence image corresponding to the infrared fluorescence region IRf may be obtained.

A third filter 27 may be disposed between the second beam splitter 24 and the imaging module 40. The third filter 27 may have a plurality of substantially discontinuous passbands. For example, the third filter 27 may block a light in a wavelength range corresponding to the fluorescence passband of the second filter 26.

In FIG. 2C, the horizontal axis denotes a wavelength, and the vertical axis denotes energy and/or power of a light passing through the third filter 26. Referring to FIG. 2C, the third filter 27 may have passbands corresponding to an ultraviolet region UV, a blue region B, a green region G, and a red region R. The range of the passbands of the third filter 27 may be substantially identical or similar to the range of the passbands of the first filter 16, respectively.

Accordingly, a fourth light L4 filtered by the third filter 27 may have a wavelength range similar to the wavelength range of the first light L1.

The imaging module 40 may obtain an image from the fourth light L4.

According to an exemplary embodiment, the imaging module 40 may include a camera using a charge-coupled device (CCD) sensor. For example, the imaging module 40 may include a line scan camera, a time-delayed integration camera, and the like. For example, the time-delayed integration camera may include a plurality of line-shaped pixels. The time-delayed integration camera may capture multiple images of the inspection target 100 at a predetermined time interval, and may overlap the images acquired through each image capturing operation to obtain a single clear image.

For example, the inspection target 100 may be an organic light-emitting display panel. In this case, the imaging module 40 may capture the fourth light L4 to obtain the image showing pixels PX disposed in a display area DA of the organic light-emitting display panel. Referring to FIG. 3, an analog image of the pixels PX may be converted into a digital image based on a gray level of luminance, and the digital image of the pixels PX may be compared with reference data such as an image of a reference area Ref to determine a defect. For example, the defect may be detected when a difference between the images corresponds to a predetermined condition. Accordingly, automatic optical inspection for the defects may be performed.

According to an exemplary embodiment, the optical inspection apparatus may further include an analysis part 1000 for determining the defect by analyzing the image of at least a portion of the inspection target 100, such as the pixels PX. For example, the analysis part 1000 may include an analysis device including an analysis processor such as a personal computer, a workstation, and a super computer, or may be connected to the analysis device.

According to an exemplary embodiment, the inspection target 100 may be an organic light-emitting display panel. Referring to FIG. 4, the organic light-emitting display panel may include driving elements TR disposed on a base substrate 110. The driving elements TR may be electrically connected to a light-emitting element. The light-emitting element may be an organic light-emitting diode.

For example, the organic light-emitting diode may include a first electrode EL1 a second electrode EL2, and an organic light-emitting layer OL disposed between the first electrode EL1 and the second electrode EL2.

For example, the base substrate 110 may include glass, quartz, sapphire, a polymer material, and the like.

According to an exemplary embodiment, the driving element TR may include a thin film transistor. For example, the driving element TR may include a plurality of thin film transistors.

For example, a channel layer of the thin film transistor may include amorphous silicon, polycrystalline silicon, or a metal oxide semiconductor. The metal oxide semiconductor may include a binary compound (ABx), a ternary compound (ABxCy), a quaternary compound (ABxCyDz), and the like that contains indium (In), zinc (Zn), gallium (Ga), tin (Sn), titanium (Ti), aluminum (Al), hafnium (Hf), zirconium (Zr), magnesium (Mg), and the like. For example, the metal oxide semiconductor may include zinc oxide (ZnOx), gallium oxide (GaOx), titanium oxide (TiOx), tin oxide (SnOx), indium oxide (InOx), indium-gallium oxide (IGO), indium-zinc oxide (IZO), indium-tin oxide (ITO), gallium-zinc oxide (GZO), zinc-magnesium oxide (ZMO), zinc-tin oxide (ZTO), zinc-zirconium oxide (ZnZrxOy), indium-gallium-zinc oxide (IGZO), indium-zinc-tin oxide (IZTO), indium-gallium-hafnium oxide (IGHO), tin-aluminum-zinc oxide (TAZO), indium-gallium-tin oxide (IGTO), and the like.

The driving element TR may be covered by an insulating structure 120. The insulating structure 120 may include a combination of an inorganic insulating layer and an organic insulating layer. For example, the insulating structure may include a gate insulating layer, an interlayer insulating layer, a via insulating layer, and the like. The via insulating layer may include an organic material.

The first electrode EL1 may operate as an anode. For example, the first electrode EL1 may be formed as a transmissive electrode or a reflective electrode depending on a light emission type. When the first electrode EL1 is formed as a reflective electrode, the first electrode EL1 may include gold (Au), silver (Ag), aluminum (Al), copper (Cu), nickel (Ni) platinum (Pt), magnesium (Mg), chromium (Cr), tungsten (W), molybdenum (Mo), titanium (Ti), and the like, and may further include a metal oxide layer including a metal oxide such as indium-tin oxide and indium-zinc oxide.

A pixel-defining layer PDL may be disposed on the insulating structure 120, and may have an opening that exposes at least a part of the first electrode EL1. For example, the pixel-defining layer PDL may include an organic insulating material. At least a part of the light-emitting layer OL may be disposed in the opening of the pixel-defining layer PDL. In an exemplary embodiment, the light-emitting layer OL may continuously extend over a plurality of pixels on the display area. In another exemplary embodiment, the light-emitting layer OL may be separated from a light-emitting layer of an adjacent pixel.

The light-emitting layer OL may include a single-layer or multilayer structure including at least one of functional layers such as a hole injection layer, a hole transport layer, an organic light-emitting layer, an electron transport layer, and an electron injection layer. The light-emitting layer OL may include a low molecular weight organic compound or a high molecular weight organic compound.

According to an exemplary embodiment, the light-emitting layer OL may generate a blue light. However, exemplary embodiments are not limited to the above configuration. In another exemplary embodiment, the light-emitting layer OL may generate a red light or a green light, or may generate lights having mutually different colors according to pixels.

The second electrode EL2 may be formed as a transmissive electrode or a reflective electrode depending on a light emission type. For example, the second electrode EL2 may include a metal, an alloy, metal nitride, metal fluoride, conductive metal oxide, or a combination thereof. For example, the second electrode EL2 may continuously extend over a plurality of pixels on the display area.

The organic light-emitting display panel may further include an encapsulation layer 132 that covers a light-emitting element array. For example, the encapsulation layer 132 may include a stacked structure of an organic thin film and an inorganic thin film. For example, the organic thin film may include a cured polymer such as polyacrylate. For example, the inorganic thin film may include silicon oxide, silicon nitride, silicon carbide, aluminum oxide, tantalum oxide, hafnium oxide, zirconium oxide, titanium oxide, and the like.

According to an exemplary embodiment, the analysis part 1000 may identify or classify a material or a cause of a defect Df by using the fluorescence images obtained by the fluorescence microscope 30. For example, a fluorescent light having a specific wavelength band may be detected from the defect Df. For example, the defect Df of the inspection target 100 may excite the first light L1 to allow the second light L2 to have the fluorescent light, and the fluorescence microscope 30 may capture the fluorescent light to obtain the fluorescence image. The analysis part 1000 may detect the defect Df based on the fluorescence image. In an exemplary embodiment, the fluorescence images and a combination thereof may be used as identification markers. For example, N identification markers may be obtained (where N corresponds to a number of fluorescence images according to wavelength bands×2). According to an exemplary embodiment, eight identification markers may be obtained.

The fluorescence image may be selectively used as necessary, and a number of identification markers may vary accordingly. For example, when the first fluorescence image corresponding to the blue fluorescence region Bf, the second fluorescence image corresponding to the green fluorescence region Gf, and the third fluorescence image corresponding to the red fluorescence region Rf are used, six identification markers may be obtained.

The defect Df may include various examples. For example, the defect Df may be aggregation of a photoresist, film disconnection of the via insulating layer, metal particles, organic particles, or the like.

For example, the defect Df may be a foreign substance (an impurity) disposed between the first electrode EL1 and the light-emitting layer OL, or a foreign substance disposed on the first electrode EL1. The foreign substance may cause a short circuit between the first electrode EL1 and the second electrode EL2.

For example, when the defect Df is a photoresist, a blue fluorescent light may be detected, and green and red fluorescent lights may not be detected. When the defect Df is an organic particle, the blue and green fluorescent lights may not be detected, and the red fluorescent light may be detected. When the defect Df includes polyimide derived from the via insulating layer or the like, the blue fluorescent light may not be detected, and the green and red fluorescent lights may be detected. When the defect Df is a copper particle, the blue and green fluorescent lights may not be detected, and the red fluorescent light may be detected.

In an exemplary embodiment, the first filter 16 may have the passbands corresponding to the ultraviolet region UV, the blue region B, the green region G, and the red region R, but exemplary embodiments are not limited thereto. For example, in order to prevent deterioration of the inspection target 100 due to an ultraviolet light, the first filter 16 may have the passbands corresponding to the blue region B, the green region G, and the red region R. In this case, the fluorescence microscope 30 may obtain a first fluorescence image corresponding to the green fluorescence region Gf, a second fluorescence image corresponding to the red fluorescence region Rf, and a third fluorescence image corresponding to the infrared fluorescence region IRf.

In addition, the third filter 27 for filtering a light incident on the imaging module 40 may be omitted as necessary. Accordingly, the light incident on the imaging module 40 may be referred to as the second light.

According to an exemplary embodiment, the defect of the inspection target may be detected, and the material of the defect may be identified or classified. More information on the defect may be obtained, and the cause of the defect may be more easily recognized. Accordingly, a solution for removing defects may be provided based on the above information.

Figure 5:
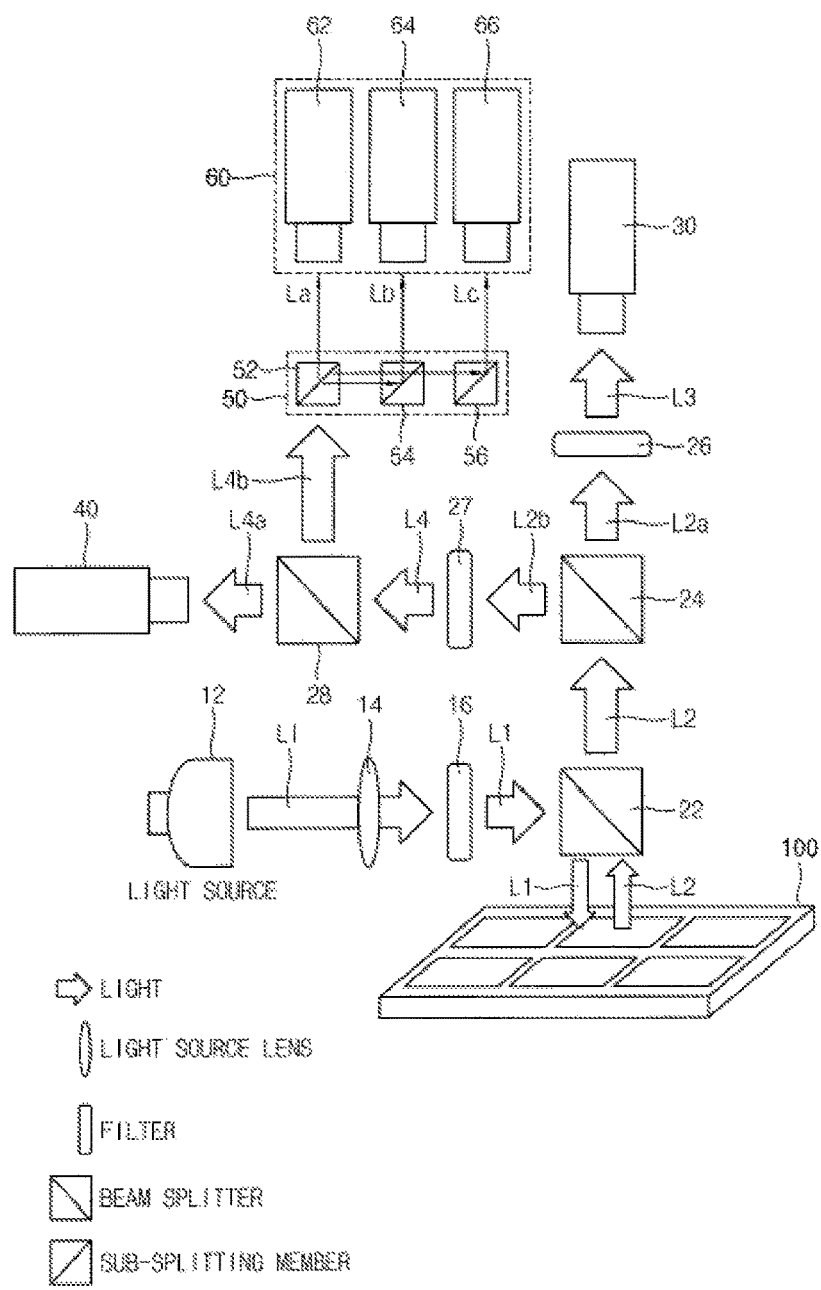
FIG. 5 is a schematic view of another exemplary embodiment of an optical inspection apparatus constructed according to the principles of the invention.
Figure 6:
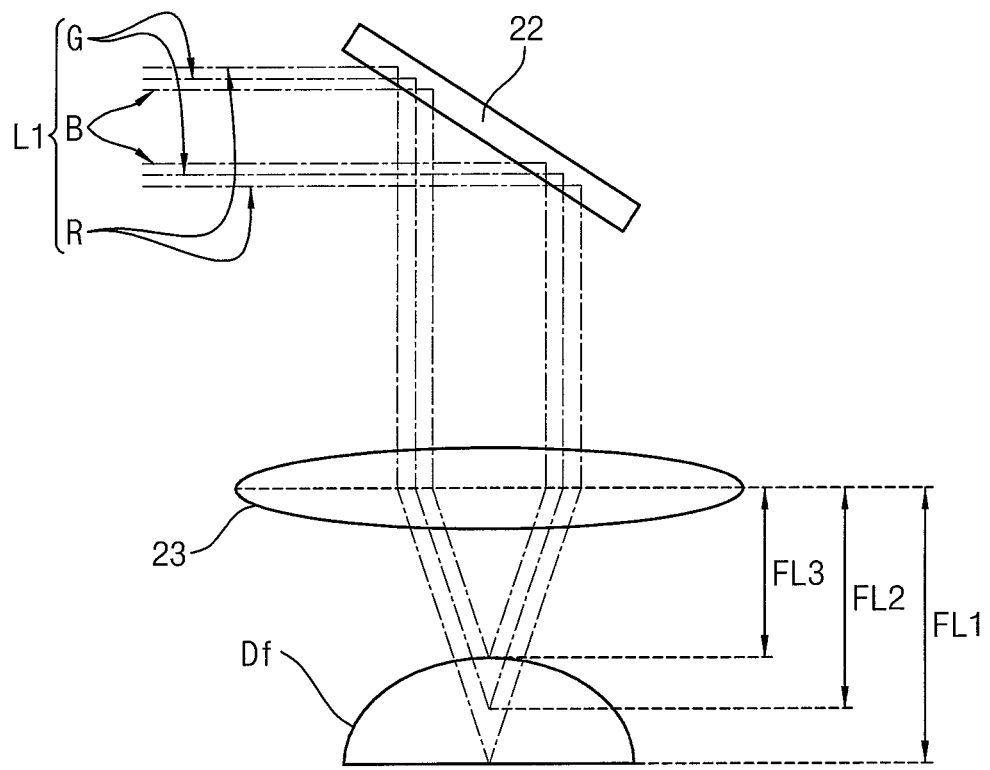
FIG. 6 is a schematic view for illustrating focal lengths of an objective lens according to wavelengths of lights in the optical inspection apparatus of FIG. 5.

FIG. 5 is a schematic view of another exemplary embodiment of an optical inspection apparatus constructed according to the principles of the invention. FIG. 6 is a schematic view for illustrating focal lengths of an objective lens according to wavelengths of lights in the optical inspection apparatus of FIG. 5.

Referring to FIG. 5, an optical inspection apparatus may include a light source 12, a light source lens 14, a first filter 16, a first beam splitter 22, a second beam splitter 24, a second filter 26, a third filter 27, a third beam splitter 28, a fluorescence microscope 30, a first imaging module 40, a multiple beam splitter 50, and a wavelength-division imaging module 60.

The optical inspection apparatus may have substantially the same configuration as the optical inspection apparatus shown in FIG. 1 except that the optical inspection apparatus further includes the third beam splitter 28, the multiple beam splitter 50, and the wavelength-division imaging module 60. Therefore, redundant descriptions thereof will be omitted.

The reflected light that is split by the second beam splitter 24 may be split by the third beam splitter 28. For example, the third beam splitter 28 may generate a third split light L4a and a fourth split light L4b.

The third split light L4a may be incident on the first imaging module 40. The first imaging module 40 may obtain an image from the third split light L4a. An analog image obtained from the third split light L4a may be converted into a digital image based on a gray level so as to be used for defect detection.

The fourth split light L4b may be incident on the multiple beam splitter 50. The multiple beam splitter 50 may split the fourth split light L4b.

For example, the multiple beam splitter 50 may include a first sub-splitting member 52, a second sub-splitting member 54, and a third sub-splitting member 56.

Each of the first sub-splitting member 52, the second sub-splitting member 54, and the third sub-splitting member 56 may include a beam splitter configured to transmit a part of the incident light and reflect a part of the incident light. For example, the first sub-splitting member 52 may transmit a part of the fourth split light L4b and reflect a part of the fourth split light L4b. The second sub-splitting member 54 may transmit a part of the light received from the first sub-splitting member 52 and reflect a part of the light received from the first sub-splitting member 52. The third sub-splitting member 56 may transmit a part of the light received from the second sub-splitting member 54 and reflect a part of the light received from the second sub-splitting member 54. In another exemplary embodiment, the third sub-splitting member 56 may be omitted or replaced with a mirror.

According to an exemplary embodiment, the multiple beam splitter 50 may output a plurality of wavelength-divided lights La, Lb, and Lc that have different wavelengths from each other and are spatially separated. For example, a first wavelength-division light La may be a red light, a second wavelength-division light Lb may be a green light, and a third wavelength-division light Lc may be a blue light. For example, in order to generate the is wavelength-divided lights La, Lb, and Lc, the multiple beam splitter 50 may include a filter disposed in a light exit path of each of the sub-splitting members 52, 54, and 56. However, exemplary embodiments are not limited to the above configuration, and the filter may be disposed at an appropriate position within a required optical path. For example, the filter may be adjacent to the wavelength-division imaging module 60, or may be included in the wavelength-division imaging module 60.

The wavelength-division imaging module 60 may include a plurality of cameras for obtaining images from the wavelength-divided lights La, Lb, and Lc, respectively. For example, the wavelength-division imaging module 60 may include a first sub-imaging module 62 configured to generate an image based on the first wavelength-division light La, a second sub-imaging module 64 configured to generate an image based on the second wavelength-division light Lb, and a third sub-imaging module 66 configured to generate an image based on the third wavelength-division light Lc.

Lights may have different focal lengths according to a wavelength. A light having a relatively long wavelength may have a relatively long focal length. For example, as shown in FIG. 6, the first light L1 incident on the first beam splitter 22 may include a blue light B, a green light G, and a red light R. When the first light L1 is reflected from the first beam splitter 22 so as to be incident on the inspection target through an objective lens 23, a focal length FL2 of the green light G may be longer than a focal length FL3 of the blue light B, and a focal length FL1 of the red light R may be longer than the focal length FL2 of the green light G.

For example, when the first light L1 is incident on a foreign substance corresponding to the defect Df, an intensity of a reflected light having a specific wavelength may be strong according to a measurement surface which may be determined by a position of the is objective lens 23. For example, when a top portion of the defect Df corresponds to the measurement surface, an intensity of the blue light B reflected by the defect Df may be strong, and when a bottom portion of the defect Df corresponds to the measurement surface, an intensity of the red light R reflected by the defect Df may be strong. The first, second, and third wavelength-division light La, Lb, and Lc may capture the blue light B, the green light G, and the red light R to provide images, and the analysis part 1000 may process the images of the first, second, and third wavelength-division light La, Lb, and Lc to obtain vertical direction information of the defect Df. Accordingly, a wavelength at which the intensity of the reflected light is strong may be detected to obtain vertical direction information (height, thickness, etc.) of the defect Df.

According to an exemplary embodiment, the optical inspection apparatus may detect first defects based on a two-dimensional image obtained by the first imaging module 40, and may detect a second defect based on the vertical direction information of the first defects obtained by the wavelength-division imaging module 60 and/or the analysis part 1000. Accordingly, reliability of the defect detection may be further improved. For example, the first defects may be referred to as preliminary defects, and the second defect may be an effective defect extracted and/or selected from the preliminary defects according to a predetermined condition based on the vertical direction information.

For example, even if a foreign substance exists in the inspection target, when the foreign substance has a thickness less than or equal to a certain level, possibility of the foreign substance being a defect may be low. Accordingly, the number of the effective defects in the inspection target may be smaller than the number of the preliminary defects detected based on the two-dimensional image.

According to an exemplary embodiment, the effective defect may be detected by combining two-dimensional information and vertical direction information of the foreign substance detected in the inspection target, so that the reliability of the defect detection may be improved, and defect information with reduced noise may be obtained.

FIGS. 7 to 11 are schematic views of still other exemplary embodiments of an optical inspection apparatus constructed according to the principles of the invention.

Figure 7:
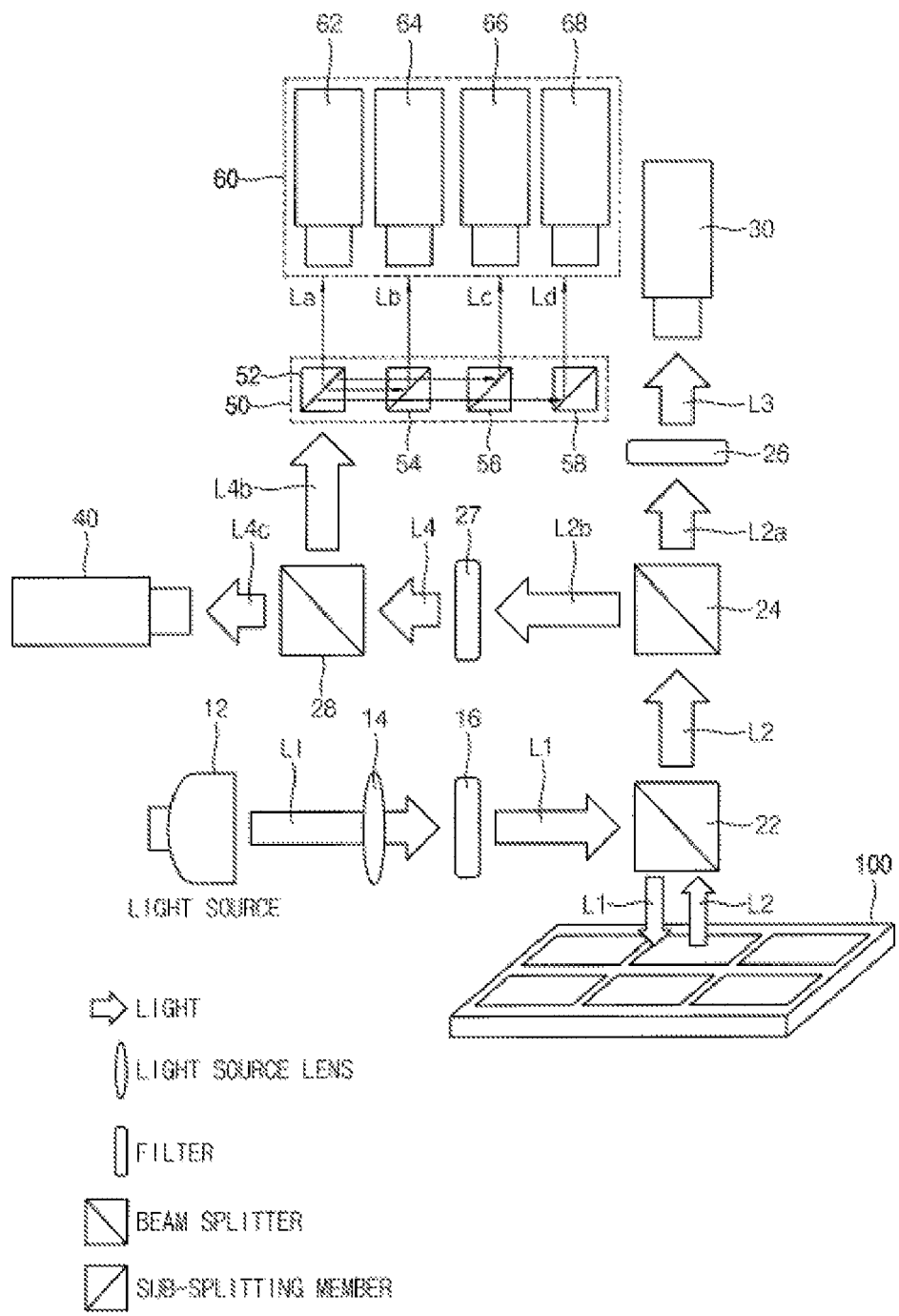
FIGS. 7 to 11 are schematic views of still other exemplary embodiments of an optical inspection apparatus constructed according to the principles of the invention.

Referring to FIG. 7, an optical inspection apparatus may include a light source 12, a light source lens 14, a first filter 16, a first beam splitter 22, a second beam splitter 24, a second filter 26, a third filter 27, a third beam splitter 28, a fluorescence microscope 30, a first imaging module 40, a multiple beam splitter 50, and a wavelength-division imaging module 60.

The optical inspection apparatus may have substantially the same configuration as the optical inspection apparatus shown in FIG. 5 except for the configuration of the multiple beam splitter 50. Therefore, redundant descriptions thereof will be omitted.

A fourth split light L4b may be incident on the multiple beam splitter 50. The multiple beam splitter 50 may split the fourth split light L4b.

For example, the multiple beam splitter 50 may include a first sub-splitting member 52, a second sub-splitting member 54, a third sub-splitting member 56, and a fourth sub-splitting member 58.

Each of the first sub-splitting member 52, the second sub-splitting member 54, the third sub-splitting member 56, and the fourth sub-splitting member 58 may include a beam splitter configured to transmit a part of an incident light and reflect a part of the incident light. For example, the first sub-splitting member 52 may transmit a part of the fourth split light L4b and reflect a part of the fourth split light L4b. The second sub-splitting member 54 may is transmit a part of the light received from the first sub-splitting member 52 and reflect a part of the light received from the first sub-splitting member 52. The third sub-splitting member 56 may transmit a part of the light received from the second sub-splitting member 54 and reflect a part of the light received from the second sub-splitting member 54. The fourth sub-splitting member 58 may transmit a part of the light received from the third sub-splitting member 56 and reflect a part of the light received from the third sub-splitting member 56.

In another exemplary embodiment, the fourth sub-splitting member 58 may be omitted or replaced with a mirror.

According to an exemplary embodiment, the multiple beam splitter 50 may output a plurality of wavelength-divided lights La, Lb, Lc, and Ld that have different wavelengths from each other and are spatially separated. For example, a first wavelength-division light La may be a red light, a second wavelength-division light Lb may be a green light, a third wavelength-division light Lc may be a blue light, and a fourth wavelength-division light Ld may be an ultraviolet light.

For example, the multiple beam splitter 50 may include a filter disposed in a light exit path of each of the sub-splitting members 52, 54, 56, and 58. However, exemplary embodiments are not limited to the above configuration, and the filter may be disposed at an appropriate position within a required optical path. For example, the filter may be adjacent to the wavelength-division imaging module 60, or may be included in the wavelength-division imaging module 60.

The wavelength-division imaging module 60 may include a plurality of cameras for obtaining images from the wavelength-divided lights La, Lb, Lc, and Ld, respectively. For example, the wavelength-division imaging module 60 may include a first sub-imaging module 62 configured to generate an image based on the first wavelength-division light La, a second sub-imaging module 64 configured to generate an image based on the second wavelength-division light Lb, a third sub-imaging module 66 configured to generate an image based on the third wavelength-division light Lc, and a fourth sub-imaging module 68 configured to generate an image based on the fourth wavelength-division light Ld.

According to an exemplary embodiment, as a difference in focal lengths of the wavelength-divided lights La, Lb, Lc, and Ld increases, reliable vertical direction information for the inspection target may be obtained.

Figure 8:
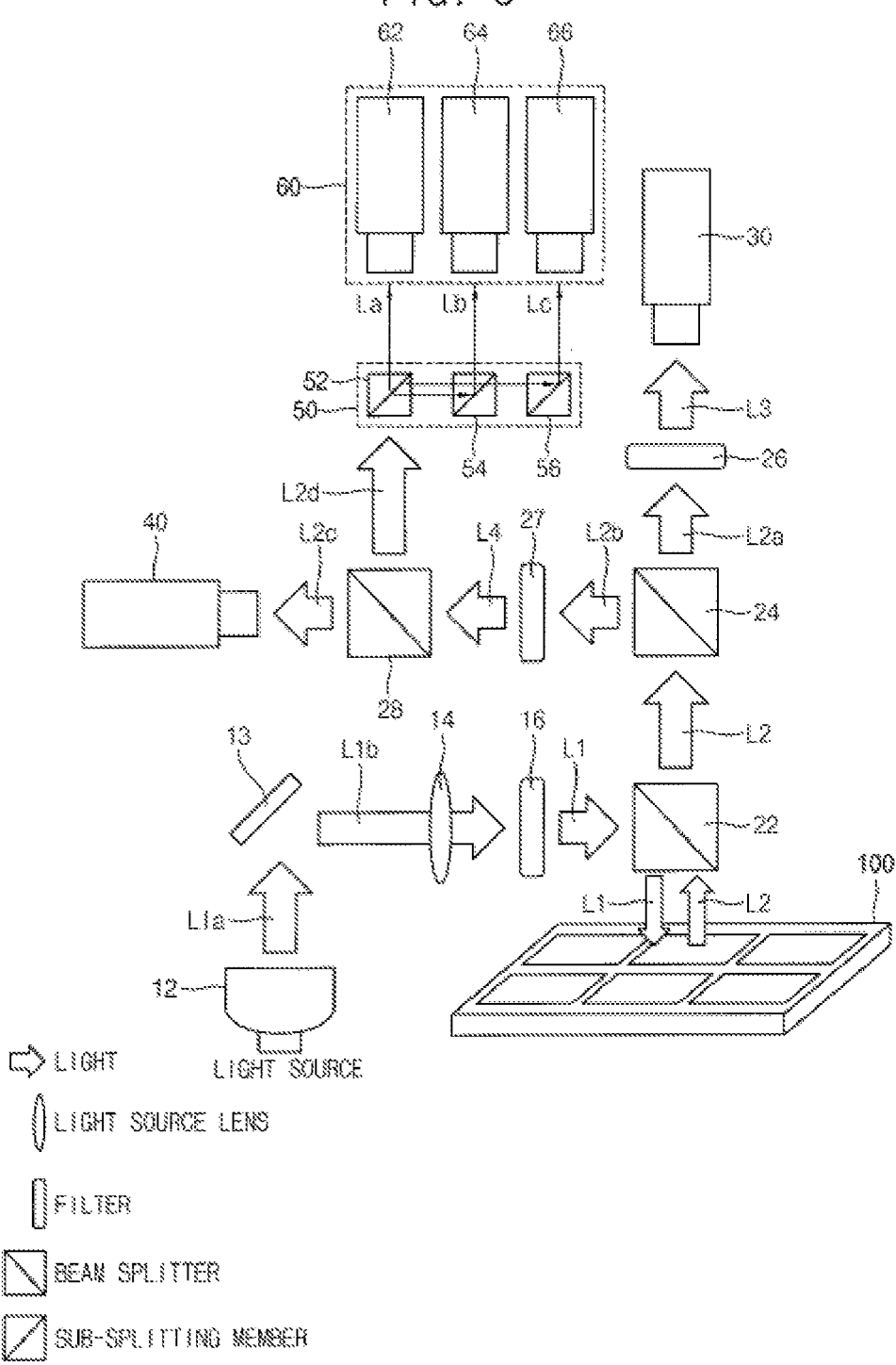

Referring to FIG. 8, according to an exemplary embodiment, an optical inspection apparatus may include a light source 12, a wavefront transformation element 13, a light source lens 14, a first filter 16, a first beam splitter 22, a second beam splitter 24, a second filter 26, a third filter 27, a third beam splitter 28, a fluorescence microscope 30, a first imaging module 40, a multiple beam splitter 50, and a wavelength-division imaging module 60.

The optical inspection apparatus may have substantially the same configuration as the optical inspection apparatus shown in FIG. 5 except for the wavefront transformation element 13. Therefore, redundant descriptions thereof will be omitted.

According to an exemplary embodiment, the wavefront transformation element 13 may include a deformable mirror. The optical inspection apparatus may improve accuracy of to the vertical direction information of the inspection target by using the wavefront transformation element 13.

For example, in order to obtain the vertical direction information of the inspection target, through-focus scanning optical microscopy (TSOM) may be performed. The wavefront transformation element 13 may change a waveform of an input light. Accordingly, two-dimensional images for the inspection target may be obtained at different focal positions. The two-dimensional images may constitute a through-focus image including an in-focus image and an out-of-focus image. An analysis part 1000 of the optical inspection apparatus may extract a luminance profile from a plurality of through-focus images for the inspection target, and may generate a TSOM image by using focus position information. The vertical direction information of the inspection target may be obtained by analyzing the TSOM image.

For example, the deformable mirror may include micro-mirrors arranged in the form of a matrix. Each of the micro-mirrors may be connected to one or more piezoelectric elements so that a displacement or an angle of the micro-mirror with respect to an optical axis direction may be adjusted according to a voltage applied to the piezoelectric element.

For example, a first initial light LIa emitted from the light source 12 may be reflected from the wavefront transformation element 13 so as to be transformed into a second initial light LIb of which a wavefront is transformed. The second initial light LIb may be incident on the first filter 16, and the second initial light LIb filtered by the first filter 16 may be transmitted to the first beam splitter 22 as a first light L1.

Accordingly, a plurality of input lights having mutually different focal lengths may be obtained through the wavefront transformation element 13, and reflected lights obtained by the input lights may be provided to the first imaging module 40 and the wavelength-division imaging module 60. According to an exemplary embodiment, the reflected lights may be converted into images by the wavelength-division imaging module 60.

According to an exemplary embodiment, the optical inspection apparatus may combine the vertical direction information obtained from the wavelength-divided lights La, Lb, and Lc with vertical direction information obtained from the wavelength-divided lights La, Lb, is and Lc associated with the reflected lights of which focal lengths are changed due to the wavefront transformation to provide more accurate vertical direction information.

Figure 9:
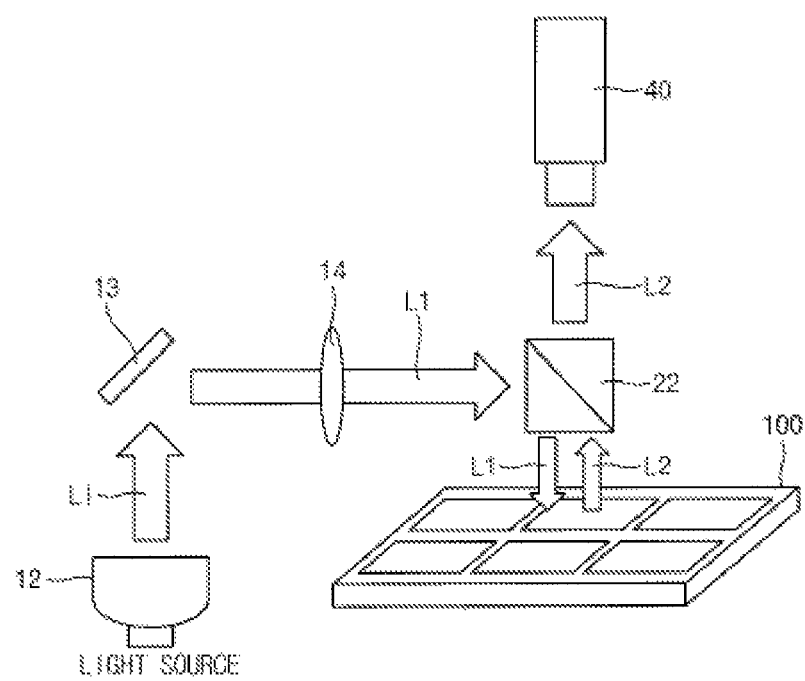

Referring to FIG. 9, according to an exemplary embodiment, an optical inspection apparatus may include a light source 12, a wavefront transformation element 13, a light source lens 14, a first beam splitter 22, and a first imaging module 40.

An initial light LI emitted from the light source 12 may be reflected from the wavefront transformation element 13 to form a first light L1 of which a wavefront is transformed. The first light L1 may be concentrated by the light source lens 14. The light source lens 14 may be disposed between the wavefront transformation element 13 and the light source 12.

The first light L1 may be incident on the first beam splitter 22. The first beam splitter 22 may transfer the first light L1 to an inspection target 100. The first light L1 reflected from the inspection target 100 may be defined as a second light L2. The second light L2 may be incident on the first imaging module 40.

The first imaging module 40 may convert the second light L2 into an image.

An analysis part of the optical inspection apparatus may detect a defect by using two-dimensional information and vertical direction information obtained from the image based on the second light L2.

Figure 10:
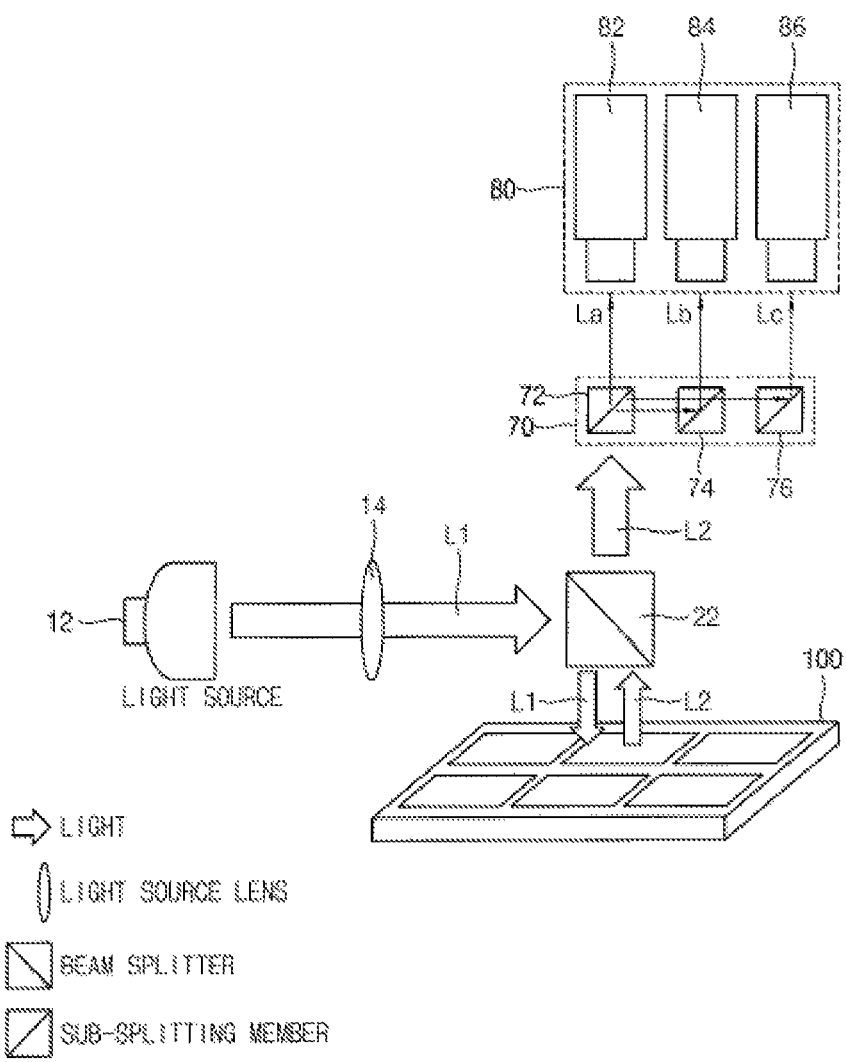

Referring to FIG. 10, according to an exemplary embodiment, an optical inspection apparatus may include a light source 12, a light source lens 14, a first beam splitter 22, a multiple beam splitter 70, and a wavelength-division imaging module 80.

A first light L1 emitted from the light source 12 may be concentrated by the light source lens 14, and may be incident on the first beam splitter 22. The first beam splitter 22 may is transfer the first light L1 to the inspection target 100. The first light L1 reflected from the inspection target 100 may be defined as a second light L2. The second light L2 may be split by the multiple beam splitter 70.

Lights obtained by performing the splitting by the multiple beam splitter 70 may be filtered to have different wavelengths from each other, and may be incident on a first sub-imaging module 82, a second sub-imaging module 84, and a third sub-imaging module 86 of the wavelength-division imaging module 80, respectively.

The wavelength-division imaging module 80 may generate a plurality of images based on divided lights La, Lb, and Lc having different wavelengths from each other.

An analysis part of the optical inspection apparatus may detect a defect by using two-dimensional information and vertical direction information obtained from an image based on the divided lights La, Lb, and Lc.

Figure 11:
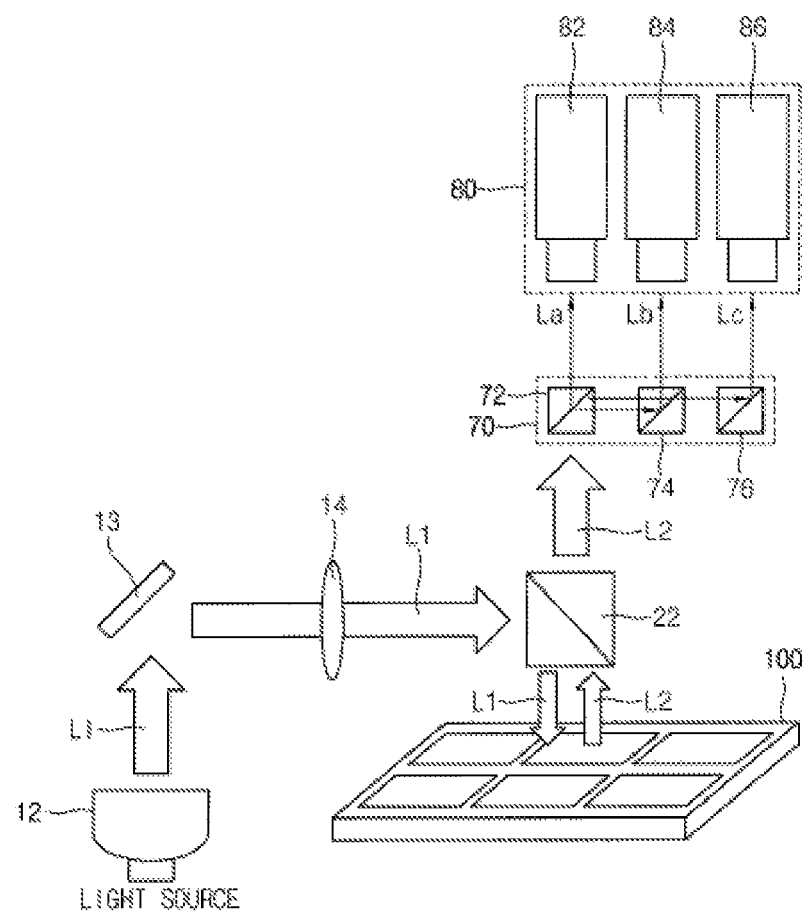

Referring to FIG. 11, according to an exemplary embodiment, an optical inspection apparatus may include a light source 12, a wavefront transformation element 13, a light source lens 14, a first beam splitter 22, a multiple beam splitter 70, and a wavelength-division imaging module 80.

The wavelength-division imaging module 80 may generate a plurality of images based on divided lights La, Lb, and Lc having different wavelengths from each other. In addition, the wavelength-division imaging module 80 may generate a plurality of images based on reflected lights of which focal lengths are changed by the wavefront transformation element 13.

An analysis part of the optical inspection apparatus may detect a defect by using two-dimensional information and vertical direction information obtained from the images.

According to exemplary embodiments, the optical inspection apparatus may obtain the two-dimensional image based on the gray level and the fluorescence image from the inspection target. The optical inspection apparatus may detect the defects based on the two-dimensional image, and may identify or classify the material or the cause of the defects based on the fluorescence image. Accordingly, detection reliability for detecting effective defects may be improved, and information for obtaining a solution for preventing defects may be provided.

In addition, the two-dimensional image and the fluorescence image may be obtained from the same input light by using the second beam splitter to provide light to each of the imaging module and the fluorescence microscope, and thus they may be obtained in a relatively short time substantially at the same time. Therefore, an inspection time may be shortened.

Further, the optical inspection apparatus may include the multiple beam splitter and the wavelength-division imaging module to generate images corresponding to light of different wavelengths, and may provide the vertical direction information of the inspection target based on the images. The optical inspection apparatus may use the vertical direction information to verify the defects. Therefore, the detection reliability for detecting the effective defects may be further improved.

Exemplary embodiments of the optical inspection apparatus may be used for inspecting various electronic devices such as an organic light-emitting display panel, an array substrate of a liquid crystal display panel, a memory cell substrate, a processor, an integrated circuit board or the like.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical inspection apparatus comprising:
    a first filter having a plurality of passbands;
    a first beam splitter to reflect a first light that exits from the first filter to transfer the first light to an inspection target;
    a second beam splitter to split a second light, which is provided by reflecting the first light by the inspection target, into a first split light and a second split light;
    a second filter to receive the first split light, and having a passband different from the passbands of the first filter;
    a fluorescence microscope to generate a fluorescence image from a third light that exits from the second filter; and
    a first imaging module to generate a first image from the second split light.

2. The optical inspection apparatus of claim 1, wherein the passbands of the first filter are discontinuous and include an ultraviolet region, a blue region, a green region, and a red region.

3. The optical inspection apparatus of claim 2, wherein the passband of the second filter includes a wavelength range corresponding to a fluorescence component generated by excitation of the first light caused by the inspection target.

4. The optical inspection apparatus of claim 3, wherein the passband of the second filter includes a blue fluorescence region, a green fluorescence region, a red fluorescence region, and an infrared fluorescence region.

5. The optical inspection apparatus of claim 1, wherein the passbands of the first filter include a blue region, a green region, and a red region.

6. The optical inspection apparatus of claim 1, further comprising:
    a third beam splitter to split the second split light into a third split light and a fourth split light;
    a multiple beam splitter to split the fourth split light into a plurality of wavelength-divided lights having different wavelengths and spatially separated from each other; and
    a second imaging module to generate second images from the plurality of wavelength-divided lights.

7. The optical inspection apparatus of claim 6, wherein the first imaging module generates the first image from the third split light.

8. The optical inspection apparatus of claim 6, wherein the wavelength-divided lights include a red light, a green light, and a blue light.

9. The optical inspection apparatus of claim 6, wherein the wavelength-divided lights include a red light, a green light, a blue light, and an ultraviolet light.

10. The optical inspection apparatus of claim 6, further comprising an analysis part to generate vertical direction information of the inspection target based on the second images.

11. The optical inspection apparatus of claim 10, wherein the analysis part is configured to:
   detect a first defect based on a two-dimensional image obtained by the first imaging module, the two-dimensional image being included in the first image, and
   detect a second defect based on the vertical direction information of the inspection target associated with the first defect.

12. The optical inspection apparatus of claim 6, further comprising a wavefront transformation element to adjust a focal length of an input light incident on the first filter.

13. The optical inspection apparatus of claim 12, wherein the wavefront transformation element includes a deformable mirror.

14. The optical inspection apparatus of claim 12, further comprising an analysis part to generate vertical direction information of the inspection target,
   wherein:
   the wavefront transformation element is configured to generate a plurality of fourth lights having mutually different focal lengths and to provide the plurality of fourth lights as the input light;
   the second imaging module is configured to generate the second images from the plurality of wavelength-divided lights associated with the plurality of fourth lights; and
   the analysis part is configured to obtain a through-focus image based on the second images and to generate the vertical direction information of the inspection target from the through-focus image.

15. The optical inspection apparatus of claim 1, further comprising a third filter disposed between the first imaging module and the second beam splitter to filter the second split light.

16. The optical inspection apparatus of claim 15, wherein the third filter is configured to block a light corresponding to the passband of the second filter.

17. The optical inspection apparatus of claim 1, further comprising an analysis part to detect a defect based on a two-dimensional image obtained by the first imaging module, the two-dimensional image being included in the first image, and to identify or classify a material or a cause of the defect based on the fluorescence image obtained by the fluorescence microscope.

18. The optical inspection apparatus of claim 1, further comprising:
   a light source to provide an initial light to the first filter; and
   a light source lens to concentrate the initial light.

19. The optical inspection apparatus of claim 18, further comprising an objective lens disposed between the first beam splitter and the inspection target.

20. The optical inspection apparatus of claim 1, wherein the inspection target includes an organic light-emitting display panel.

* * * * *